March 6, 1951     H. GAFFIN     2,543,963
GASKETED JOINT
Filed Oct. 12, 1946
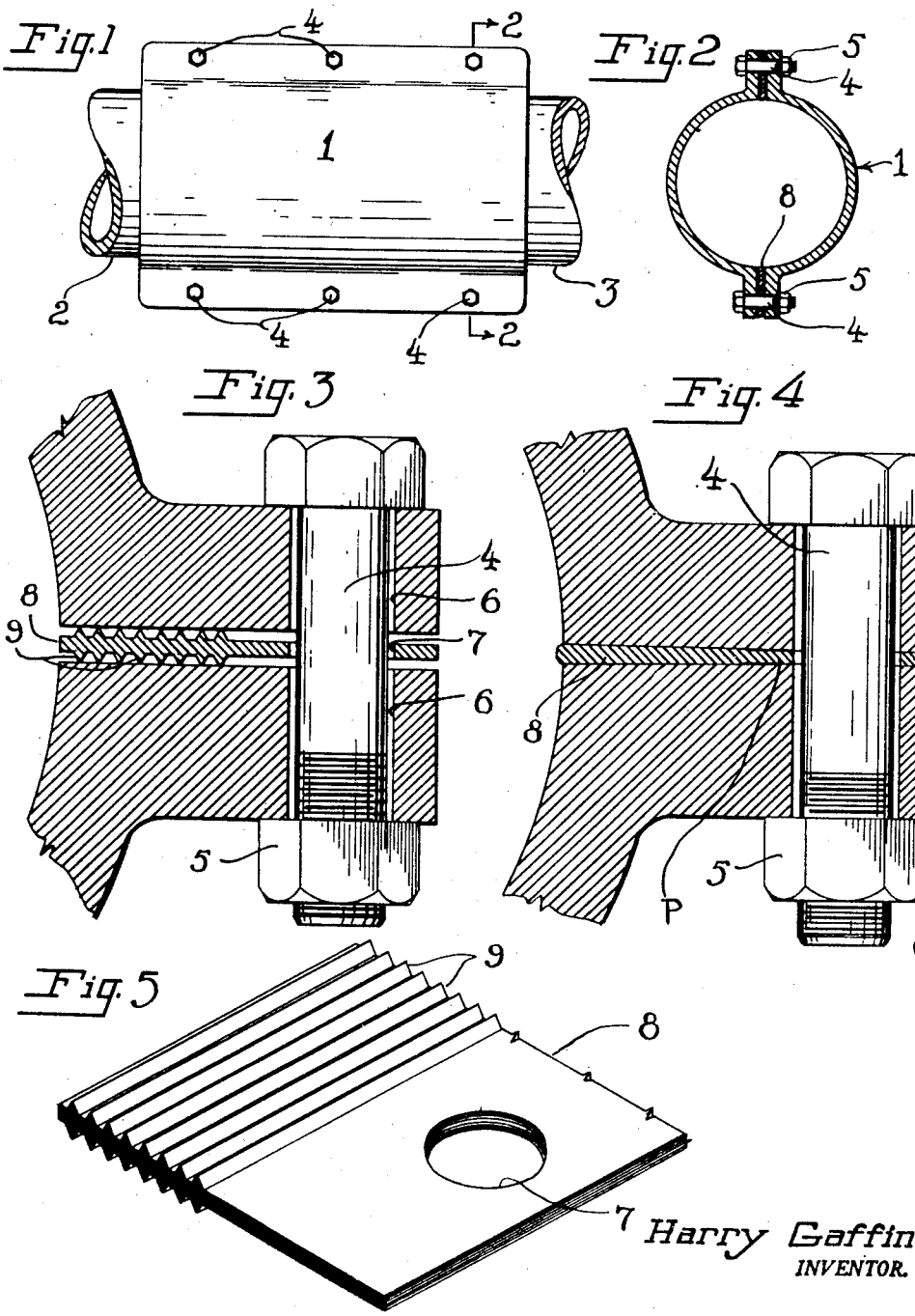
Harry Gaffin
INVENTOR.
BY Patented Mar. 6, 1951

2,543,963

UNITED STATES PATENT OFFICE 2,543,963

GASKETED JOINT

Harry Gaffin, East Orange, N. J., assignor to The A. P. Smith Manufacturing Company, East Orange, N. J., a corporation of New Jersey Application October 12, 1946, Serial No. 702,907

4 Claims. (Cl. 285—194)

This invention relates to improvements in gasketed joints.

An object of the invention is to provide a gasketed joint which furnishes an efficient seal between flanges and which minimizes danger of breakage during tightening up on the bolts or other members by which the flanges are held together and the gasket is compressed.

Another object of the invention is to provide a seal which is readily applied in the field.

A further object of the invention is to provide a gasket of high sealing efficiency but which is cheaply manufacturable in a variety of forms for different applications.

With these and other objects which will appear in the following full description in mind, the invention consists in the combinations and arrangements of parts, and details of construction which will now first be fully described in connection with the accompanying drawing and then be more particularly pointed out in the appended claims.

In the drawing:

Figure 1 is a plan view of a pipe sleeve coupling and pipe sections coupled thereby;

Figure 2 is a section through the sleeve of Figure 1 and is taken on the line 2—2 of Figure 1;

Figure 3 is an enlargement of a portion of Figure 2, showing the flanges and gasket prior to compression of the latter;

Figure 4 is a view similar to Figure 3 but showing the gasket compressed; and

Figure 5 is a fragmentary isometric of one end of the gasket of the previous figures.

Figure 1 shows a split sleeve 1 joining two pipe sections, 2 and 3. The two halves of the sleeve are held together by bolts 4 and cooperating nuts 5 (Figures 2 and 4), the bolts passing through bores 6 in the cooperating sleeve flanges and through bolt holes 7 in the gasket 8. The means by which the sleeeve 1 is sealed to the pipe sections 2 and 3 (as well as the pipe sections themselves in Figs. 2 and following) are omitted from the drawing since these may be any of the conventional means known in the art and form no part of the present invention.

While the gasketed joint has been shown as applied to a sleeve, it will be understood that it may be utilized in any jointed construction where the parts are fastened together by means of a flange on one or both members, such flange or flanges being external of an enclosed space which is to be sealed. The gasket 8 is formed of lead or other similar compressible material and where the gasket is straight, as is the case in joining a sleeve, it may be formed very simply as an extruded strip. More complex shapes may require different processes of manufacture.

The gasket 8 is generally flat and of uniform thickness but is thickened to one side by means of the transversely spaced ridges 9 so that this side is serrated and of greater average thickness than the other. The specific form of the ridges 9 and the specific way in which the gasket is serrated are not critical.

In making the joint, the sleeve elements are assembled together with the gasket and bolts as shown in Figure 3 and the bolts are tightened to compress the gasket and crush the ridges 9 thereof, as shown in Figure 4, forming a tight seal between the coupled flanges and the gasket along the inner side of the latter (the left side in Figures 3 to 5, inclusive).

It will be noted that the serrated or ribbed area of the gasket is of less width than the flanges, which increases the crushing force of the bolt pressure exerted upon the flanges, per unit area of gasket sealing surface and thus increases the efficiency of the seal for given bolt pressure. Secondly, the serrated area of the gasket, which is of greater average thickness than the remainder and which is crushed by the application of pressure, is located inwardly of the joint or line of application of pressure by the bolts. In consequence, when the bolts are tightened up enough to subject the flanges to a strain capable of deforming them, even slightly, the flange surfaces adjacent the bolts will be brought somewhat closer together than the flange surfaces lying inwardly and in contact with the serrated portion of the gasket. Accordingly, pressure will now be exerted on the flat solid area of the gasket lying close to the bolts and either inwardly or outwardly thereof, approximately at the respective locations P and Q. As soon as this deflection and pressure transference has occurred, the fulcrum against which the bolt pressure works in its tendency to flex the flange is shifted to a point close to the point of application of the pressure and the bending moment which tends to fracture the flange is reduced to a small fraction of what it would otherwise be. In this way, an efficient seal under practical bolt pressure is provided and danger of fracture of a flange due to excessive bolt tension is eliminated or substantially reduced.

What is claimed is:

1. A gasketed joint comprising a flange, a member to be joined thereto, bolts for drawing said flange and member together, a gasket of lead or similar material between said flange and member, the said gasket having a serrated and crushable portion inwardly of said bolts and an outer bolt pressure-sustaining portion of less thickness than the average thickness of said serrated portion, whereby tightening the bolts first crushes the said inward portion of the gasket to form a seal and further tightening exerts pressure on the outer pressure-sustaining portion of the gasket.

2. A gasketed joint comprising cooperating flanges, bolts for drawing said flanges together, a gasket of lead or similar material between said flanges, the said gasket having a serrated and crushable portion inwardly of said bolts and an outer bolt pressure-sustaining portion of less thickness than the average thickness of said serrated portion, whereby tightening the bolts first crushes the said inward portion of the gasket to form a seal and further tightening exerts pressure on the outer pressure-sustaining portion of the gasket.

3. A gasketed pipe sleeve joint comprising sleeve sections having cooperating flanges, bolts for drawing said flanges together, a gasket of lead or similar material between said flanges, the said gasket being formed as a strip having a serrated and crushable portion inwardly of the line of the said bolts and an outer pressure-sustaining portion of less thickness than the average thickness of said serrated portion, whereby tightening the bolts first crushes the said inward portion of the gasket to form a seal and further tightening exerts pressure on the outer pressure-sustaining portion of the gasket.

4. A gasket having a plurality of bolt holes, a serrated and crushable portion to one side of the said bolt holes and a solid bolt pressure-sustaining portion along the said bolt holes and to the other side thereof, whereby crushing pressure may be applied to the said serrated portion by members joined with bolts passing through said bolt holes and the load may be taken by the solid pressure-sustaining portion upon further tightening.

HARRY GAFFIN.

REFERENCES CITED

The following references are of record in the file of this patent:

UNITED STATES PATENTS

| Number | Name | Date |
| --- | --- | --- |
| 695,174 | Roller | Mar. 11, 1902 |
| 1,628,090 | Weiss | May 10, 1927 |
| 1,942,704 | Hubbard et al. | Jan. 9, 1934 |
| 2,307,440 | Wilson | Jan. 5, 1943 |